United States Patent
Wang et al.

(10) Patent No.: US 7,613,139 B1
(45) Date of Patent: Nov. 3, 2009

(54) DETECTING AN ACCESS POINT IN A WIRELESS LOCAL AREA NETWORK FAILING TO ADHERE TO PROPER POWER MANAGEMENT PROTOCOL

(75) Inventors: Kevin Wang, Sunnyvale, CA (US); Miles Wu, Fremont, CA (US); Chia-Chee Kuan, Los Altos, CA (US)

(73) Assignee: Fluke Corporation, Everett, WA (US)

( * ) Notice: Subject to any disclaimer, the term of this patent is extended or adjusted under 35 U.S.C. 154(b) by 699 days.

(21) Appl. No.: 10/703,945

(22) Filed: Nov. 7, 2003

(51) Int. Cl.
*G08C 17/00* (2006.01)

(52) U.S. Cl. .................. 370/311; 370/318; 370/346; 455/574

(58) Field of Classification Search ............ 370/311, 370/338, 423, 318, 346; 455/522, 574
See application file for complete search history.

(56) References Cited

U.S. PATENT DOCUMENTS

| | | | |
|---|---|---|---|
| 6,018,642 A * | 1/2000 | Adachi ................ 340/7.33 |
| 6,067,297 A * | 5/2000 | Beach ................. 370/389 |
| 6,192,230 B1 * | 2/2001 | van Bokhorst et al. ... 455/343.3 |
| 6,546,074 B1 * | 4/2003 | Blundell et al. .......... 378/73 |
| 6,693,888 B2 * | 2/2004 | Cafarelli et al. ........ 370/338 |
| 6,934,299 B2 * | 8/2005 | Kaatz .................. 370/459 |
| 6,983,167 B2 * | 1/2006 | Adachi et al. .......... 455/522 |
| 7,126,945 B2 * | 10/2006 | Beach ................. 370/389 |
| 7,274,929 B1 * | 9/2007 | Banginwar ............ 455/418 |
| 7,406,319 B2 * | 7/2008 | Kostic et al. .......... 455/453 |
| 2002/0132603 A1 * | 9/2002 | Lindskog et al. ....... 455/343 |
| 2004/0246922 A1 * | 12/2004 | Ruan et al. ........... 370/331 |
| 2005/0018624 A1 * | 1/2005 | Meier et al. ........... 370/318 |

OTHER PUBLICATIONS

ISO/IEC; ("Part 11 Wireless LAN Medium Access Control (MAC) and Phyical Layer (PHY) specifications"); 1999; ISO/IEC 8802-11:1999(E); pp. 1-513.*
Jung et al.; ("An Energy Efficient MAC Protocol for Wireless LANs"); 2002; IEEE; pp. 1756-1764.*
Tseng et al.; ("Power-Saving Protocols for IEEE 802.11-Based Multi-Hop Ad Hoc Networks"); 2002; IEEE; pp. 200-208.*

* cited by examiner

*Primary Examiner*—Ricky Ngo
*Assistant Examiner*—Dewanda Samuel
(74) *Attorney, Agent, or Firm*—Blakely, Sokoloff, Taylor & Zafman LLP

(57) ABSTRACT

In a wireless local area network, an access point failing to adhere to proper power management protocol is detected by analyzing a beacon frame sent by the access point to determine if a traffic information map (TIM) in the beacon frame is zero. A frame sent by a station is analyzed to determine if the station is in a power save mode. A data frame sent by the access point is analyzed to determine if the data frame is destined for the station. An improper power management protocol condition of the access point is determined based on the foregoing analysis.

41 Claims, 6 Drawing Sheets

DETECTING AN ACCESS POINT IN A WIRELESS LOCAL AREA NETWORK FAILING TO ADHERE TO PROPER POWER MANAGEMENT PROTOCOL

BACKGROUND

1. Field of the Invention

The present application generally relates to wireless local area networks. More particularly, the present application relates to detecting an access point in a wireless local area network failing to adhere to proper power management protocol.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

To conserve power used by stations in the WLAN, the current IEEE 802.11 standard includes a power management protocol. In accordance with the power management protocol, an access point buffers data frames for a station that is in a power save mode. When a data frame for the station has been buffered at the access point, the access point sends a beacon frame with a traffic information map (TIM) to inform the station. The station can then wake from the power save mode to receive the buffered data frame. However, for a number of reasons, such as improper installation or configuration, the access point may fail to adhere to proper power management protocol, which can result in the data frame being sent to the station while the station is still in a power save mode.

SUMMARY

In one embodiment of the present invention, an access point in a wireless local area network failing to adhere to proper power management protocol is detected by analyzing a beacon frame sent by the access point to determine if a traffic information map (TIM) in the beacon frame is zero. A frame sent by a station is analyzed to determine if the station is in a power save mode. A data frame sent by the access point is analyzed to determine if the data frame is destined for the station. An improper power management protocol condition of the access point is determined based on the foregoing analysis.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
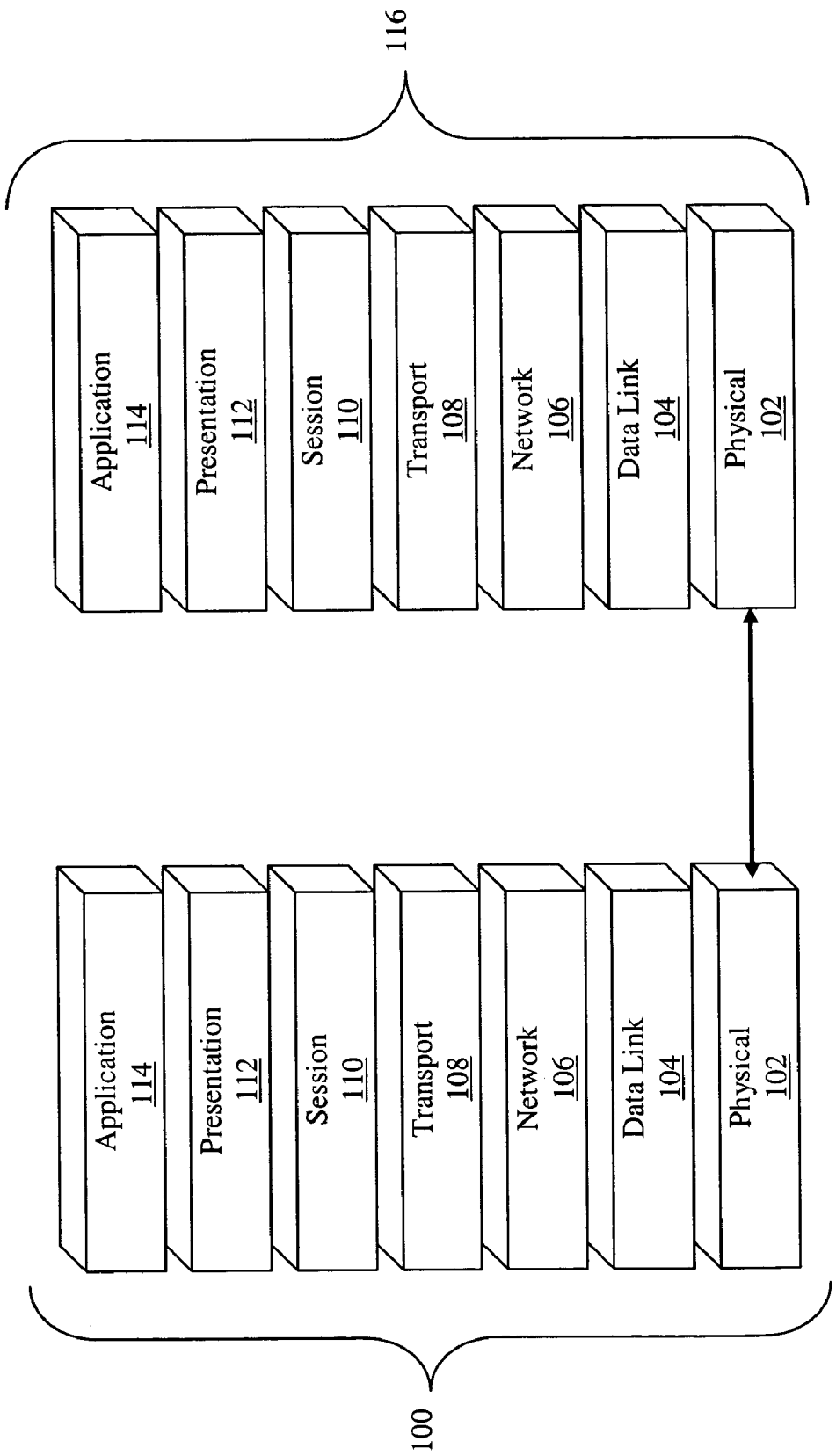
FIG. 1 shows an exemplary Open Systems Interconnection (OSI) seven layer model.

With reference to FIG. 1, an exemplary Open Systems Interconnection (OSI) seven layer model is shown, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers 100 and 116 can communicate directly with each other only at the physical layer 102. However, different computers 100 and 116 can effectively communicate at the same layer using common protocols. For example, in one exemplary embodiment, computer 100 can communicate with computer 116 at application layer 114 by propagating a frame from application layer 114 of computer 100 through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks ("WLANs") operates at the data link layer 104, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
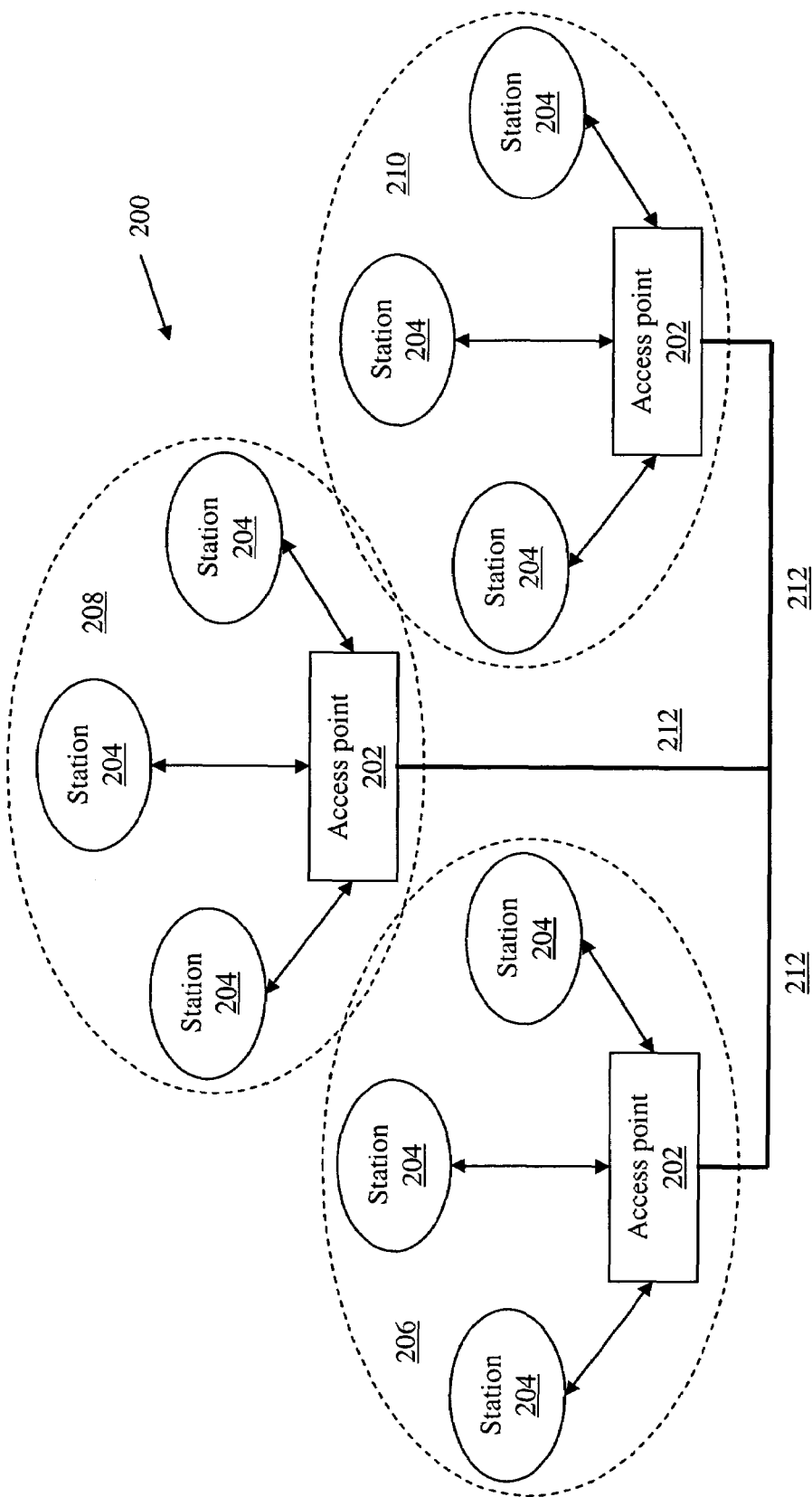
FIG. 2 shows an exemplary extended service set in a wireless local area network ("WLAN")

With reference to FIG. 2, an exemplary extended service set 200, which forms a WLAN according to the IEEE 802.11 standard, is depicted having basic service sets ("BSS") 206, 208, and 210. Each BSS can include an access point ("AP") 202 and stations 204. A station 204 is a component that can be used to connect to the WLAN, which can be mobile, portable, stationary, and the like, and can be referred to as the network adapter or network interface card. For instance, a station 204 can be a laptop computer, a personal digital assistant, and the like. In addition, a station 204 can support station services such as authentication, deauthentication, privacy, delivery of data, and the like.

Each station 204 can communicate directly with an AP 202 through an air link, such as by sending a radio or infrared signal between WLAN transmitters and receivers. Each AP 202 can support station services, as described above, and can additionally support distribution services, such as association, disassociation, distribution, integration, and the like. Accordingly, an AP 202 can communicate with stations 204 within its BSS 206, 208, and 210, and with other APs 202 through medium 212, called a distribution system, which forms the backbone of the WLAN. This distribution system 212 can include both wireless and wired connections.

Figure 3:
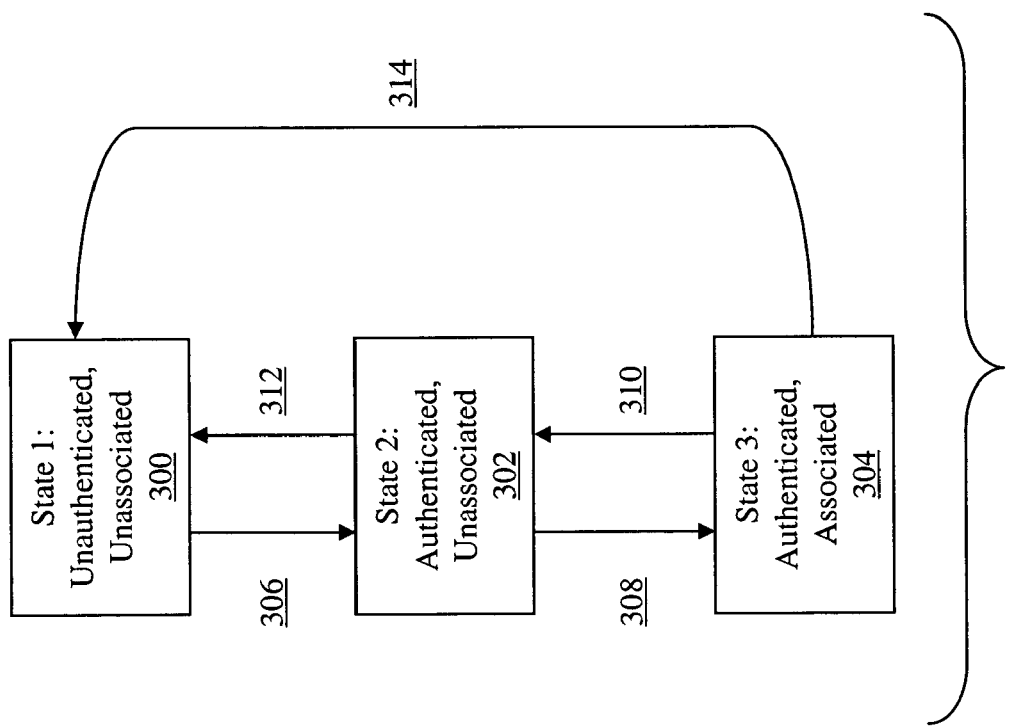
FIG. 3 is an exemplary flow diagram illustrating various states of stations in a WLAN.

With reference to FIGS. 2 and 3, under the current IEEE 802.11 standard, each station 204 must be authenticated to and associated with an AP 202 in order to become a part of a BSS 206, 208, or 210. Accordingly, with reference to FIG. 3, a station 204 begins in State 1 (300), where station 204 is unauthenticated to and unassociated with an AP 202. In State 1 (300), station 204 can only use a limited number of frame types, such as frame types that can allow station 204 to locate and authenticate to an AP 202, and the like.

If station 204 successfully authenticates 306 to an AP 202, then station 204 can be elevated to State 2 (302), where station 204 is authenticated to and unassociated with the AP 202. In State 2 (302), station 204 can use a limited number of frame types, such as frame types that can allow station 204 to associate with an AP 202, and the like.

If station 204 then successfully associates or reassociates 308 with AP 202, then station 204 can be elevated to State 3 (304), where station 204 is authenticated to and associated with AP 202. In State 3 (304), station 204 can use any frame types to communicate with AP 202 and other stations 204 in the WLAN. If station 204 receives a disassociation notification 310, then station 204 can be transitioned to State 2. Furthermore, if station 204 then receives deauthentication notification 312, then station 204 can be transitioned to State 1. Under the IEEE 802.11 standard, a station 204 can be authenticated to different APs 202 simultaneously, but can only be associated with one AP 202 at any time.

With reference again to FIG. 2, once a station 204 is authenticated to and associated with an AP 202, the station 204 can communicate with another station 204 in the WLAN. In particular, a station 204 can send a message having a source address, a basic service set identification address ("BSSID"), and a destination address, to its associated AP 202. The AP 202 can then distribute the message to the station 204 specified as the destination address in the message. This destination address can specify a station 204 in the same BSS 206, 208, or 210, or in another BSS 206, 208, or 210 that is linked to the AP 202 through distribution system 212.

Although FIG. 2 depicts an extended service set 200 having three BSSs 206, 208, and 210, each of which include three stations 204, it should be recognized that an extended service set 200 can include any number of BSSs 206, 208, and 210, which can include any number of stations 204.

Figure 4:
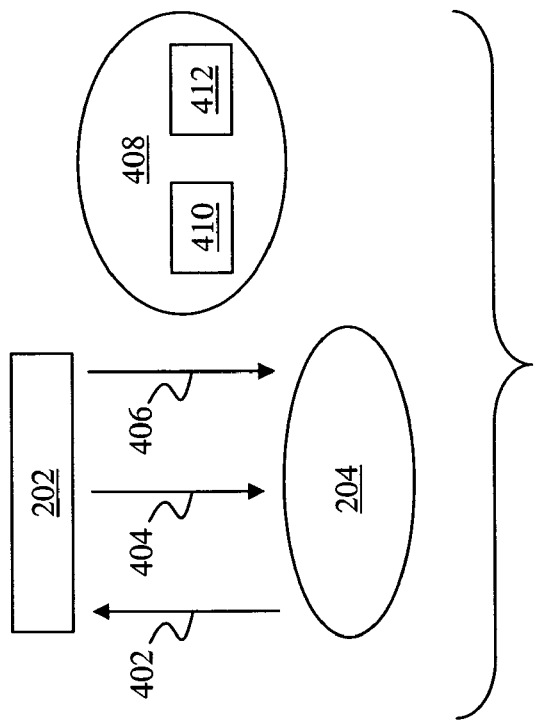
FIG. 4 shows an exemplary embodiment of an access point, a station, and a detector.

With reference to FIG. 4, under the current IEEE 802.11 standard, a station 204 can operate in an active mode or a Power-Save (PS) mode. When in the active mode, the antenna and transmitter of station 204 are turned on. To conserve power, when in the PS mode, the antenna and transmitter of station 204 are turned off.

The current IEEE 802.11 standard includes a power management protocol to enable buffering of data frames at AP 202 when station 204 is in a PS mode. In accordance with the power management protocol as set forth in the current IEEE 802.11 standard, station 204 informs AP 202 when it enters the PS mode.

Figures 5, 6:
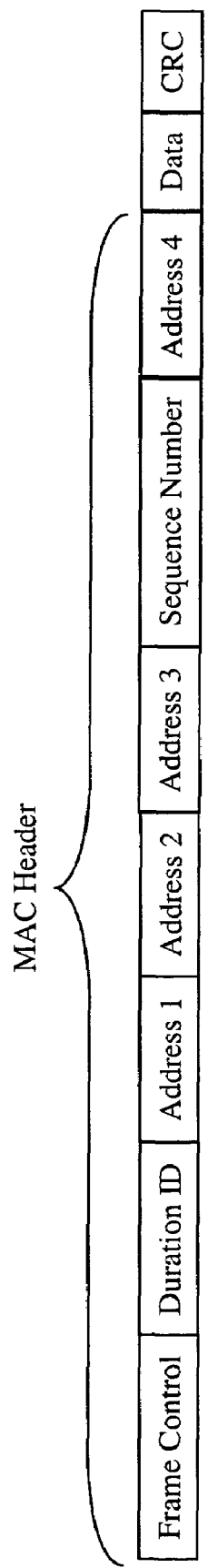
FIG. 5 shows an exemplary frame format.
FIG. 6 shows and exemplary frame control field.

More particularly, as depicted in FIG. 5, an exemplary frame format has three primary portions (i.e., a Medium Access Control (MAC) header, data, and CRC portions). The MAC header includes a frame control field. As depicted in FIG. 6, in a frame (e.g., a management frame (such as an association frame, authentication frame, and the like), date frame, and the like) the frame control field includes a power management bit. With reference again to FIG. 4, before entering the PS mode, station 204 sends a frame with the power management bit set.

When AP 202 receives the association request with the power management bit set, AP 202 buffers data frames that are destined for station 204. When a data frame has been buffered for station 204, AP 202 sends a beacon frame with an indication in the traffic indication map (TIM) sent with the beacon frame to inform station 204 that the buffered data frame exists.

More particularly, every station 204 that is associated with AP 202 is assigned an association identification (AID). The AID of a station 204 corresponds to a single bit in the TIM for that station 204. When the bit in the TIM corresponding to a particular station 204 is set, then at least one buffered data frame for that particular station 204 exists at AP 202. When the bit in the TIM corresponding to that particular station 204 is clear, then there are no buffered data frames for that particular station 204 at AP 202.

For example, assume station 204 depicted in FIG. 4 is assigned an AID of one. Thus, the first bit in the TIM corresponds to station 204. Thus, when the first bit in the TIM is set, then at least one buffered data frame for station 204 exists at AP 202. When the first bit in the TIM is clear, then there are no buffered data frames for station 204 at AP 202.

Thus, station 204 can determine if a buffered data frame for station 204 exists at AP 202 by examining the TIM sent with the beacon frame by AP 202. More particularly, station 204 occasionally enters the active mode to receive and examine beacon frames sent by AP 202. When station 204 determines from a received beacon frame, and more particularly the TIM sent with the beacon frame, that a buffered data frame for station 204 exists, station 204 remains in the active mode and can prompt AP 202 to send the buffered data frame. For example, station 204 can send a PS poll frame or a null function frame to AP 202. Alternatively, in some configurations, AP 202 can be configured to send the buffered data frame after sending a given number of beacon frames to inform station 204 that a buffered data frame exists. In these configurations, after receiving the beacon frame from AP 202, station 204 remains active and waits for the buffered data frame to be sent.

However, for a number of reasons, such as improper installation or configuration, AP 202 may fail to adhere to proper power management protocol. More particularly, AP 202 may send the buffered data frame to station 204 without first sending a beacon frame with a TIM indicating to station 204 that a data frame has been buffered.

Figure 7:
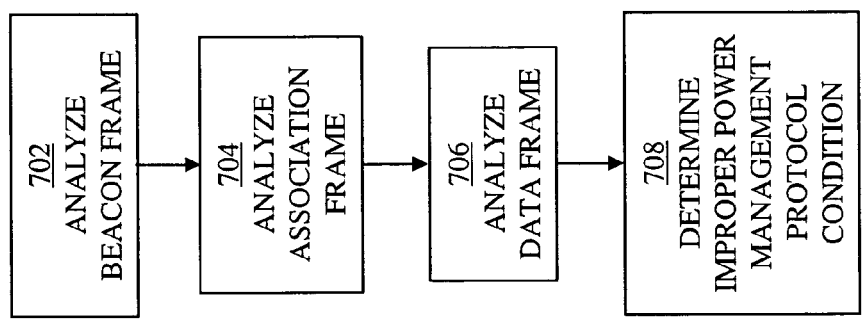
FIG. 7 shows an exemplary flow diagram of a process for detecting when an access point fails to adhere to proper power management protocol.

With reference to FIG. 7, an exemplary process is depicted for detecting when an AP fails to adhere to proper power management protocol. In 702, beacon frames sent by the AP are analyzed to determine if the TIMs in the beacon frames are zero. In 704, frames sent by a station are analyzed to determine if the station is in a power save mode. In 706, data frames sent by the AP are analyzed to determine if the data frames are destined for the station. In 708, an improper power management protocol condition for the AP is determined based on 702, 704, and 706. Although 704 is depicted as following 702 and 706 is depicted as following 704, it should be recognized that 702, 704, and 706 can be performed in various orders.

As described earlier, before going into a power save mode, a station sends a frame (such as a management frame, data frame, and the like) with the power management bit set. Thus, in 704, if the power management bit of the frame sent by the station is set, then the station can be determined to be in a power save mode.

As also described earlier, a station sends a power save poll frame or a null function frame when it is not in a power save mode. Thus, in 704, if a power save poll frame or a null function frame is sent by the station, then the station can be determined to be not in a power save mode.

In 706, a data frame includes a destination address field. Thus, when the destination address of the data frame is the station, then the data frame can be determined to be destined for the station.

In one exemplary embodiment, an AP can be determined to have failed to adhere to proper power management protocol, which corresponds to the improper power management protocol condition having been determined, if a data frame is sent by the AP to a station when the station is in a power save mode without first having sent a beacon frame with a TIM to indicate to the station that the AP has a buffered data frame for the station. In one implementation, rather than determined if the AP has sent a beacon frame with a TIM that specifically identifies the station, the improper power management protocol condition is determined if the AP fails to send a beacon frame with a TIM that is non-zero. Thus, if the AP is determined to have sent a beacon frame with a TIM that is non-zero, then the AP is determined to be adhering to proper power management protocol.

In the present exemplary embodiment, the exemplary process depicted in FIG. 7 can be performed using software and/or hardware installed on a detector in the wireless local area network. With reference to FIG. 4, detector 408 can receive frames 402 sent by station 204 and beacon frames 404, data frames 406 sent by AP 202 using antenna 410. Detector 408 also includes a processor 412. In one embodiment, the detector is a station in the wireless local area network. Additionally, the station can be mobile, portable, stationary, and the like. For instance, the station can be a laptop computer, a personal digital assistant, and the like. In addition, the station can be used by a user as a diagnostic tool, by an administrator as an administrative tool, and the like, to assess the quality of communications in the WLAN.

Figure 8:
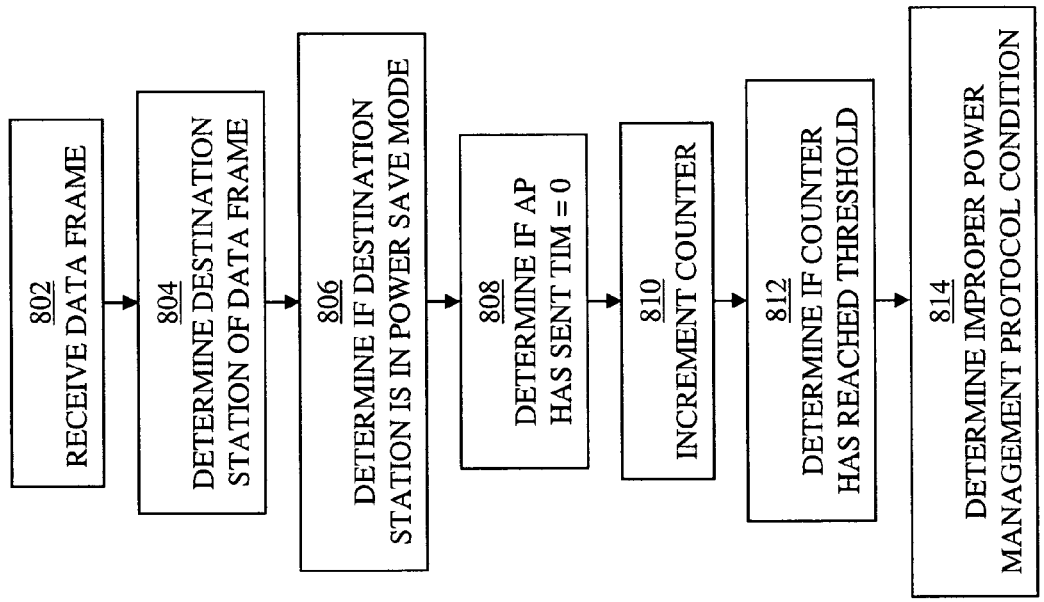
FIG. 8 shows another exemplary flow diagram of a process for detecting when an access point fails to adhere to proper power management protocol.

With reference to FIG. 8, another exemplary process is depicted for detecting when an AP fails to adhere to proper power management protocol. In 802, a data frame sent by an AP is received. In 804, the received data frame is examined to determine the destination station. In 806, an inquiry is made to determine if the destination station is in a power save mode. In 808, an inquiry is made to determine if the AP that sent the data frame has sent a beacon frame with a TIM that is zero. In 810, if the destination station is in a power save mode and the AP has sent the beacon frame with a TIM that is zero, then a counter is incremented. In 812, an inquiry is made to determine if the counter has reached a threshold. In 814, if the counter has reached the threshold, then an improper power management protocol condition is determined for the AP.

In the present exemplary embodiment, 806 includes maintaining a list of stations in the wireless local area network and a record indicating whether the stations on the list are in a power save mode. Thus, in 806, the destination station is located on the list to determine if the destination station is in a power save mode.

Figure 9:
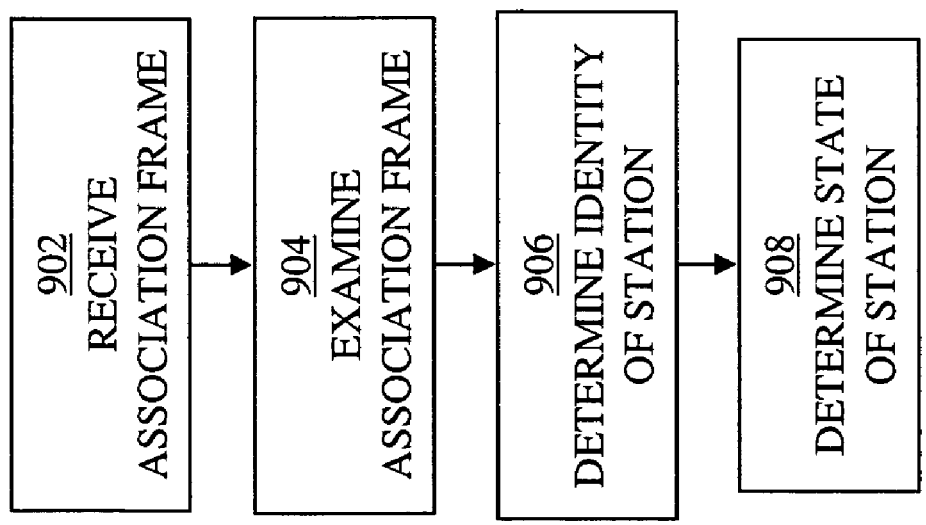
FIG. 9 shows an exemplary flow diagram of a process for determining whether a station is in a power save mode.

With reference to FIG. 9, an exemplary process is depicted to create and maintain the listing of stations and the record indicating whether the stations on the list are in a power save mode. In 902, a frame sent by a station in the wireless local area network is received. In 904, the received frame is examined. In 906, the station that sent the frame is identified based on the examined frame. More particularly, the frame includes a source address, which can be used to identify the station that sent the frame. If the station is not on the list of stations, then the station is added. In 908, the state of the station is determined based on the examined frame. More particularly, as described above, if the power management bit is set, then the station can be determined to be in a power save mode. If a power save poll frame or a null function frame is sent by the station, then the station can be determined to be not in a power save mode.

With reference to FIG. 8, in the present exemplary embodiment, 808 includes maintaining a list of APs in the wireless local area network and a record indicating whether the APs on the list have sent a beacon frame with a TIM set to zero. Thus, in 808, the AP that sent the received data frame, which can be identified based on the source address of the received data frame, is located on the list to determine if the AP has sent a beacon frame with a TIM set to zero.

Figure 10:
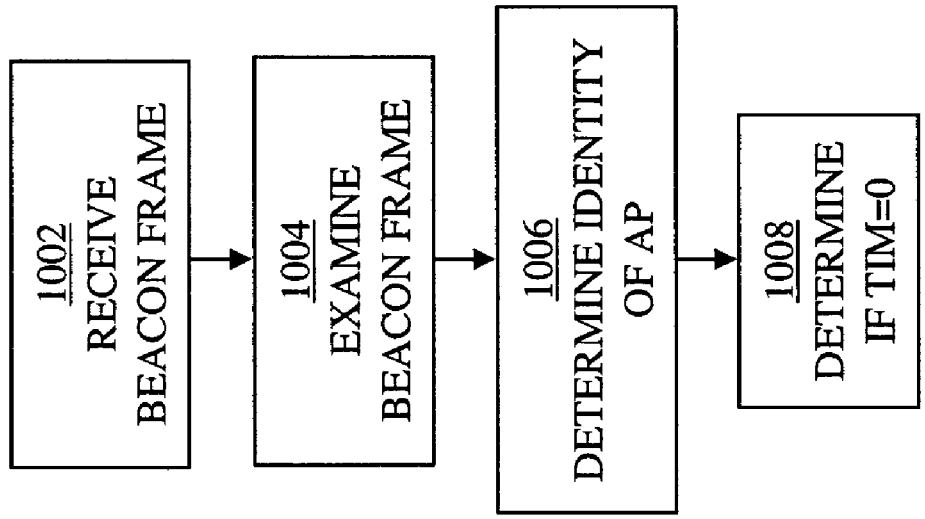
FIG. 10 shows an exemplary flow diagram of a process for determining whether an access point has sent a beacon frame with a traffic information map set to zero.

With reference to FIG. 10, an exemplary process is depicted to create and maintain the listing of APs and the record indicating whether the APs on the list have sent a beacon frame with a TIM set to zero. In 1002, a beacon frame sent by an AP in the wireless local area network is received. In 1004, the received beacon frame is examined. In 1006, the AP that sent the beacon frame is identified based on the examined beacon frame. More particularly, the beacon frame includes a source address, which can be used to identify the AP that sent the beacon frame. If the AP is not on the list of APs, then the AP is added. In 1008, the TIM of the received beacon frame is examined to determine if the TIM has been set to zero.

In one exemplary embodiment, if an AP is determined to have sent a beacon frame with a TIM not set to zero, then the AP is assumed to be adhering to proper power management protocol. Thus, the AP that sent the beacon frame is no longer monitored.

With reference again to FIG. 8, in the present exemplary embodiment, the counter in 810 is reset after a period of time. It should be recognized that the period of time can be any amount of time, such as 2 minutes, and can be adjusted. Additionally, when multiple APs are being monitored, a separate counter can be maintained for each AP.

In the present exemplary embodiment, the threshold in 810 can be set at any number, such as 50, and can be adjusted. Additionally, when multiple APs are being monitored, the same threshold can be used for all of the APs or different thresholds can be used for different APs.

In the present exemplary embodiment, the exemplary processes depicted in FIGS. 8-10 can be performed using software and/or hardware installed on a detector in the wireless local area network. Additionally, the exemplary processes depicted in FIGS. 8-10 can each run as separate threads in a software application.

Although the present invention has been described with respect to certain embodiments, examples, and applications, it will be apparent to those skilled in the art that various modifications and changes may be made without departing from the invention.

We claim:

1. A method of detecting an access point in a wireless local area network failing to adhere to proper power management protocol, the method comprising:
   a) analyzing a beacon frame sent by the access point to determine if at least a portion of a traffic information map (TIM) in the beacon frame is zero;
   b) analyzing a frame sent by a station to determine if the station is in a power save mode;
   c) analyzing a data frame sent by the access point to determine if the data frame is destined for the station; and
   d) determining that the access point fails to operate according to the proper power management protocol based on determining that the access point fails to send the TIM in the beacon frame that is non-zero and based on b), and c).

2. The method of claim 1, wherein a) comprises:
   identifying the access point that sent the beacon frame;
   determining if the identified access point is in a list of access points;
   when the identified access point is not on the list of access points, adding the identified access point to the list of access points;
   determining if the TIM in the beacon frame is zero; and
   when the TIM in the beacon frame is zero, updating a record associated with the identified access point to indicate that the identified access point has sent a beacon frame with a TIM set to zero.

3. The method of claim 1, wherein b) comprises:
   identifying the station that sent the frame;
   determining if the identified station is in a list of stations;
   when the identified station is not on the list of station, adding the identified station to the list of stations;
   determining if the identified station is in a power save mode; and
   updating a record associated with the identified station to indicate whether the identified station is in a power save mode.

4. The method of claim 1, wherein b) comprises:
   when the frame sent by the station is a management frame or a data frame, examining a power management bit in the management frame or data frame; and
   when the power management bit is set, determining that the station is in the power save mode.

5. The method of claim 1, wherein b) comprises:
   when the frame sent by the station is a power save poll frame, determining that the station is not in the power save mode.

6. The method of claim 1, wherein b) comprises:
   when the frame sent by the station is a null function frame, determining that the station is not in the power save mode.

7. The method of claim 1, wherein c) comprises:
   examining a destination address of the data frame; and
   when the destination address is the station, determining that the data frame is destined for the station.

8. The method of claim 1, wherein the improper power management protocol condition is determined when:
   the data frame is destined for the station;
   the station is in a power save condition when the data frame is sent by the access point; and
   the access point has not sent a beacon frame with a non-zero TIM.

9. The method of claim 1, further comprising:
   when the TIM in the beacon frame is non-zero, determining a proper power management protocol condition of the access point.

10. The method of claim 1, further comprising:
    incrementing a counter when the data frame is destined for the station, the station is in a power save condition, and the TIM in the beacon frame is zero.

11. The method of claim 10, further comprising:
    determining if the counter has reached a threshold; and
    when the counter is determined to have reached the threshold, determining the improper power management protocol condition.

12. The method of claim 11, further comprising:
    resetting the counter after a period of time.

13. The method of claim 1, wherein a) to d) are performed at a detector in the wireless local area network that receives the beacon frame and the data frame sent by the access point and the frame sent by the station.

14. A method of detecting an access point in a wireless local area network failing to adhere to proper power management protocol, the method comprising:
    a) receiving a data frame sent by the access point in the wireless local area network;
    b) determining a destination station of the received data frame;
    c) determining if the destination station is in a power save mode;
    d) determining if the access point that sent the data frame has sent a beacon frame with a traffic information map (TIM) set to zero;
    e) when the destination station is in the power save mode and if the access point that sent the data frame has sent the beacon frame with the TIM set to zero, incrementing a counter for the access point that sent the data frame;
    t) determining if the counter for the access point that sent the data frame has reached a threshold; and
    g) when the counter for the access point that sent the data frame has reached the threshold, determining that the access point that sent the data frame fails to operate according to the power management protocol.

15. The method of claim 14, further comprising:
    receiving a frame sent by a station in the local area network;
    examining the received frame;
    identifying the station that sent the frame;
    determining if the identified station is in a list of stations;
    when the identified station is not on the list of station, adding the identified station to the list of stations;
    determining if the identified station is in a power save mode; and
    updating a record associated with the identified station to indicate whether the identified station is in a power save mode.

16. The method of claim 15, wherein determining if the identified station is in a power save mode comprises:
    when the received is a management frame or data frame, examining a power management bit in the management frame or data frame; and
    when the power management bit is set, determining that the identified station is in the power save mode.

17. The method of claim 15, wherein determining if the identified station is in a power save mode comprises:
    when the received frame is a power save poll frame or the null function frame, determining that the station is not in the power save mode.

18. The method of claim 15, wherein determining if the destination station is in a power save mode comprises:
    locating the destination station, in the list of stations;
    accessing the record associated with the destination station that indicates whether the destination station is in a power save mode.

19. The method of claim 14, further comprising:
receiving a beacon frame sent by an access point in the local area network;
examining the received beacon frame;
identifying the access point that sent the beacon frame;
determining if the identified access point is in a list of access points;
when the identified access point is not on the list of access points, adding the identified access point to the list of access points;
determining if the TIM in the received beacon frame is set to zero; and
updating a record associated with the identified access point to indicate whether the identified access point has sent a beacon frame with the TIM set to zero.

20. The method of claim 19, wherein determining if the access point that set the data frame has sent a beacon frame with a TIM set to zero comprises:
locating the access point that sent the data frame in the list of access points;
accessing the record associated with the access point that sent the data frame that indicates whether the access point that sent the data frame has sent a beacon frame with the TIM set to zero.

21. The method of claim 19, further comprising:
when the TIM in the received beacon frame is non-zero, determining a proper power management protocol condition of the access point.

22. The method of claim 14, further comprising:
resetting the counter after a period of time.

23. The method of claim 14, wherein a) to g) are performed at a detector in the wireless local area network that receives the data frame sent by the access point.

24. An apparatus for detecting an access point in a wireless local area network failing to adhere to proper power management protocol, the apparatus comprising:
an antenna configured to received frames sent in the wireless local area network; and
a processor configured to:
a) analyze a beacon frame sent by the access point to determine if a traffic information map (TIM) in the beacon frame is zero;
b) analyze a frame sent by a station to determine if the station is in a power save mode;
c) analyze a data frame sent by the access point to determine if the data frame is destined for the station; and
d) determine that the access point fails to operate according to the power management protocol based on determining that the access point fails to send the TIM in the beacon frame that is non-zero and based on b), and c).

25. The apparatus of claim 24, wherein the processor is further configured to:
identify the access point that sent the beacon frame;
determine if the identified access point is in a list of access points;
when the identified access point is not on the list of access points, add the identified access point to the list of access points;
determine if the TIM in the beacon frame is zero; and
when the TIM in the beacon frame is zero, update a record associated with the identified access point to indicate that the identified access point has sent a beacon frame with a TIM set to zero.

26. The apparatus of claim 24, wherein the processor is further configured to:
identify the station that sent the frame;
determine if the identified station is in a list of stations;
when the identified station is not on the list of station, add the identified station to the list of stations;
determine if the identified station is in a power save mode; and
update a record associated with the identified station to indicate whether the identified station is in a power save mode.

27. The apparatus of claim 24, wherein the processor is configured to:
when the frame sent by the station is a management frame or data frame, examine a power management bit in the management frame or data frame; and
when the power management bit is set, determine that the station is in the power save mode.

28. The apparatus of claim 24, wherein the processor is configured to:
when the frame sent by the station is a power save poll frame or a null function frame, determine that the station is not in the power save mode.

29. The apparatus of claim 24, wherein the improper power management protocol condition is determined when:
the data frame is destined for the station;
the station is in a power save condition when the data frame is sent by the access point; and
the access point has not sent a beacon frame with a non-zero TIM.

30. The apparatus of claim 24, wherein the processor is further configured to:
increment a counter when the data frame is destined for the station, the station is in a power save condition, and the TIM in the beacon frame is zero.

31. The apparatus of claim 30, wherein the processor is further configured to:
determine if the counter has reached a threshold; and
when the counter is determined to have reached the threshold, determine the improper power management protocol condition.

32. The apparatus of claim 31, wherein the processor is further configured to:
reset the counter after a period of time.

33. A computer-readable storage medium storing computer executable code to detect an access point in a wireless local area network failing to adhere to proper power management protocol, the computer-readable storage medium storing instructions for:
a) analyzing a beacon frame sent by the access point to determine if a traffic information map (TIM) in the beacon frame is zero;
b) analyzing a frame sent by a station to determine if the station is in a power save mode;
c) analyzing a data frame sent by the access point to determine if the data frame is destined for the station; and
d) determining that the access point fails to operate according to the power management protocol based on determining that the access point fails to send the TIM in the beacon frame that is non-zero, and based on b), and c).

34. The computer-readable storage medium of claim 33, wherein a) comprises:
identifying the access point that sent the beacon frame;
determining if the identified access point is in a list of access points;
when the identified access point is not on the list of access points, adding the identified access point to the list of access points;
determining if the TIM in the beacon frame is zero; and
when the TIM in the beacon frame is zero, updating a record associated with the identified access point to indicate that the identified access point has sent a beacon frame with a TIM set to zero.

35. The computer-readable-storage medium of claim 33, wherein b) comprises:
   identifying the station that sent the frame;
   determining if the identified station is in a list of stations;
   when the identified station is not on the list of station, adding the identified station to the list of stations;
   determining if the identified station is in a power save mode; and
   updating a record associated with the identified station to indicate whether the identified station is in a power save mode.

36. The computer-readable storage medium of claim 33, wherein b) comprises:
   when the frame sent by the station is a management frame or data frame, examining a power management bit in the management frame or data frame; and
   when the power management bit is set, determining that the station is in the power save mode.

37. The computer-readable storage medium of claim 33, wherein b) comprises:
   when the frame sent by the station is a power save poll frame or a null function frame, determining that the station is not in the power save mode.

38. The computer-readable storage medium of claim 33, wherein the improper power management protocol condition is determined when:
   the data frame is destined for the station;
   the station is in a power save condition when the data frame is sent by the access point; and
   the access point has not sent a beacon frame with a non-zero TIM.

39. The computer-readable storage medium of claim 33, wherein
   the computer executable code further comprising
   incrementing a counter when the data frame is destined for the station, the station is in a power save condition, and the TIM in the beacon frame is zero.

40. The computer-readable storage medium of claim 39, wherein
   the computer executable code further comprising
   determining if the counter has reached a threshold; and
   when the counter is determined to have reached the threshold, determining the improper power management protocol condition.

41. The computer-readable storage medium of claim 40, wherein
   the computer executable code further comprising
   resetting the counter after a period of time.

* * * * *

UNITED STATES PATENT AND TRADEMARK OFFICE
CERTIFICATE OF CORRECTION

PATENT NO. : 7,613,139 B1  Page 1 of 1
APPLICATION NO. : 10/703945
DATED : November 3, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Nineteenth Day of October, 2010

David J. Kappos
*Director of the United States Patent and Trademark Office*